INVENTORS
WALTER B. FARNSWORTH, JR
RAYMOND E. ARMSTRONG, JR.

BY *William F. Mesinger*

ATTORNEY

United States Patent Office 3,188,191
Patented June 8, 1965

3,188,191
METHOD OF SEVERING GLASS TUBING
Walter B. Farnsworth, Jr., Amherst, N.Y., and Raymond E. Armstrong, Jr., Clark Township, Union County, N.J., assignors to Union Carbide Corporation, a corporation of New York
Filed Aug. 6, 1959, Ser. No. 832,065
5 Claims. (Cl. 65—113)

This application is a continuation in part of application Serial No. 664,771, filed June 10, 1957, now abandoned.

This invention relates to an improved method of severing glass tubing and a burner apparatus therefor.

In the conventional flame crack-off method of severing glass tubing, the tubing is drawn in a continuous length from a revolving mandrel by a traction device. Severing equipment moves back and forth along the tubing for cutting it into sections of desired lengths. The severing equipment generally includes a sharp edged scoring tool and a heating head, the latter being used to apply a thin band of heat around the tubing at the desired point of severance. The scoring tool effects severance of the tubing by its combined scoring action and the thermal shock to the tubing when it is applied to the heat band. When severance is established according to this method the break is usually irregular and ragged.

It is known that because of the poor edge quality which results from this severing method, the tubing must be cracked off in longer lengths than is required. The tubing must then be further processed by cutting it down to its proper dimensions and heating it to smooth the jagged edge. The ordinary method is to cut off a section of glass, fire polish one end, then turn it around and properly dimension the other end by grinding, and fire polishing. This is costly and time consuming.

Frequently, the severed tubing contains cracks which extend lengthwise into the tubing, making it unsatisfactory for commercial glass tubing and resulting in glass loss.

It is therefore highly desirable in the glass tubing industry to be able to expedite the severing of glass tubing and the smooth finishing of the severed edges thereof. Any expedient that will enable an operator to accurately sever glass tubing into sections of predetermined lengths without incurring the present day glass losses, represents a desirable gain.

It is therefore an important object of the present invention to provide an improved method and apparatus for rapidly severing glass tubing and smoothly finishing the severed edges thereof.

Another object of the present invention is to provide a new and improved method of cutting glass which will substantially eliminate the occurrence of ragged tube edges and provide substantially uniformly cut tube lengths of any desired size.

Another object of the present invention is to provide a flame head for cutting glass tubing which will provide a dependable means for cutting a glass tubing and uniformly simultaneously fire polishing the pair of tube ends resulting from each cutting.

Other objects, features and advantages of the present invention will be apparent from the following detailed description of a preferred embodiment thereof in which.

In brief, the invention contemplates a method for severing a continuous length of glass tubing into predetermined desired short lengths and simultaneously fire polishing the severed portions to provide smooth end faces thereon. The method consists essentially of impinging upon a horizontally and rotatably moving glass tube a series of heating flames which are localized at, and converge on a narrow band about the tube circumference. After being sufficiently heated and softened, axial tension is applied to the tube on either side of the band, such that the tube will be parted at that point. Thereafter, both severed tube ends are fire polished by the impinging heating flames.

Figure 1:
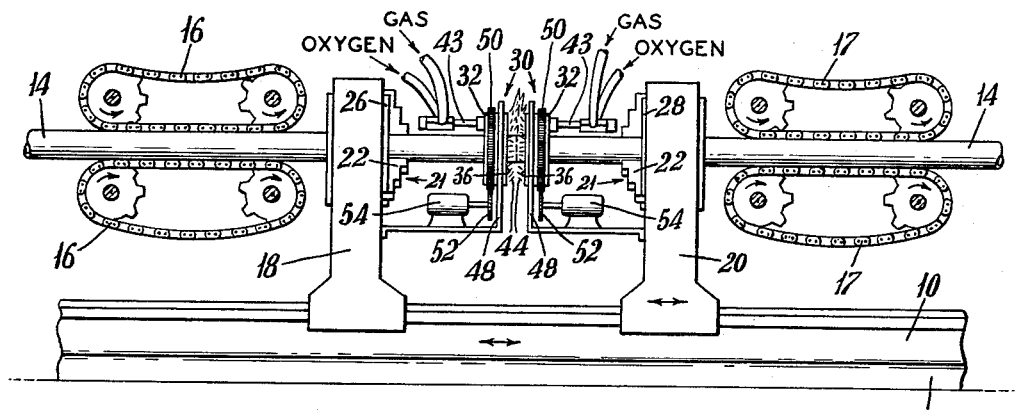
FIG. 1 is a front elevational view of an illustrative apparatus embodying the principles of the present invention.

The apparatus adapted to perform the aforementioned process is shown in FIG. 1 and comprises essentially a carriage 10 which is horizontally movable along a path or track 12 disposed approximately parallel to a glass tube 14 to be severed into short lengths. The tube may consist of a simple elongated tube section or may be a continuous length of glass issuing from a machine disposed to the left of the pictured carriage 10 although not shown in the drawings. For convenience, the apparatus will be hereinafter described in relation to the latter type of tube. The carriage may be moved in a horizontal direction by any appropriate means such as an interval motor and transmission system or by a means external to the carriage such as an adjustable speed motor utilizing a chain or similar drive for engaging the carriage.

The tube 14 may be advanced by conventional tractional means 16 and 17 which serve to apply tension at spaced intervals along the length of the tubing and also impart a rotary motion to the tubing about its longitudinal axis.

The glass severing station shown in FIG. 1 includes a pair of posts 18 and 20 positioned on the carriage 10, and movable independently of each other in a direction parallel to the movement of the carriage. Horizontal displacement of the respective posts may be accomplished by means of individual motors, or alternatively, post 18 may be held stationary while only post 20 is adapted to travel. The actual magnitude of horizontal motion between the posts need not be excessive but only sufficiently great to apply axial tension to a heated glass tube in order that the thermally stressed section may be readily severed.

Each of the posts 18 and 20 is equipped with a freely rotatable chuck or tube clamping device 21, a preferred embodiment of which comprises a plurality of co-operatively movable jaws 22, co-ordinated to automatically close and engage the outer surface of the rotating glass tube 14. Upon grasping the said tube, the chucks are free to rotate therewith, by means of the large ring bearings 26 and 28 retained within posts 18 and 20, respectively.

Figure 2:
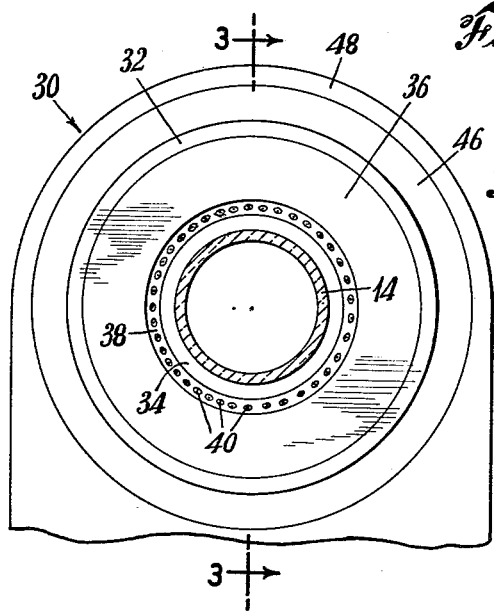
FIG. 2 is an enlarged end view of one of the burner elements shown in FIG. 1.

As illustrated in FIGS. 1 and 2, each post is provided with a flame ring assembly 30 which comprises a pair of annular burners 32 having axial bores 34, 34 arranged coaxially with the tubing 14 in spaced concentric relation thereto, each burner preferably being made from a metal material, for example, brass, in two sections and suitably secured by any desired means. The pair of burners 32, 32, is provided with confronting annular flat faces 36, each face terminating in an inner chamfered marginal surface 38 having therein a plurality of spaced flame ports or orifices 40. Fuel and air are supplied into the mixed gas manifold 42 of the burner by conventional pipe connection 43. The flame ports 40 which communicate with the mixed gas manifold 42 are convergently angled so as to provide a conically truncated flame jet 44, as seen in FIG. 1, at the adjacent or flame ends of the bore 34 intermediate the burner 32, 32. The flame jets 44 co-act with each other when properly positioned to impinge on a localized narrow band about the periphery of the tubing 14 to be severed.

Figure 3:
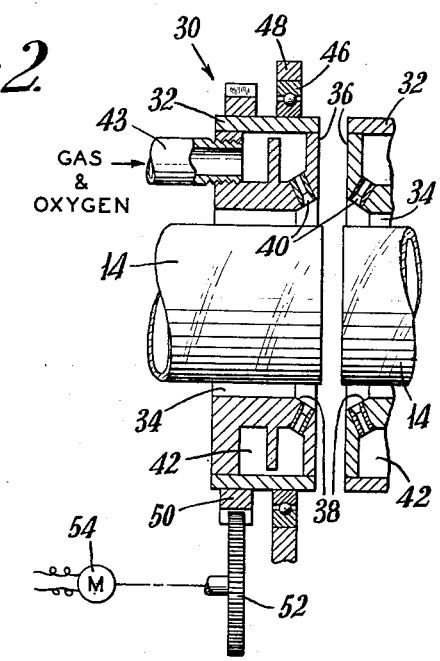
FIG. 3 is an enlarged sectional view taken along line 3—3 in FIG. 2 illustrating the positioning of the burner elements of the invention immediately after severance of a glass tubing.

To provide a more uniform distribution of heat at the tube section to be severed, the respective burners are rotatable to a limited extent about the tubing. As shown in FIG. 3, each burner is securely fixed to the inner face of a bearing 46 which is in turn retained within a circular opening in the bracket 48.

A ring gear 50 surrounding the rear portion of the burner 22 and fixed thereto engages and is driven by a pinion gear 52. An adjustable speed, reversible motor 54 to which pinion 52 is fastened permits the burner to be controllably rotated about tube 14 at any desired speed and direction and thereby provide a uniform heat distribution at the severing band.

Referring to FIG. 1, the bracket 48 is fixedly secured to the respective posts 18 and 20 so that in each instance, the post, chuck, burner and tube remain in a set horizontal relationship to each other. As to the individual posts, though, each may move or be driven independently of the other along the carriage 10 so that the required tension in the glass tube is applied at the time of severance by moving post 20 horizontally away from post 18, in effect stretching the tube until it parts. In a preferred embodiment of the invention, post 20 can be pre-set by automatic means, such as a timing device, to move a pre-determined distance from the other post thereby applying the necessary tension and effecting severance of the heat-softened tube.

Referring again to FIG. 1, as the glass tube 14 moves to the right through the severing station, the carriage 10, with both chucks open, is operably located in preparation for a cut by positioning the posts a sufficient distance apart to permit the heating flames emitting from the respective jets 28 to concentrate in a common focus or ring. Both chucks 21 are then clamped simultaneously about the moving tube 14 while the carriage moves to the right at the same rate of travel as the tube. After a sufficient lapse of time to permit softening of the tube, by impingement of the flames, axial tension is applied to the softened ring section by advancing post 20 toward the right of the carriage 10. This causes the severed portion of the tube at the right to slide forward through the tension applying means 17. In that both the severed tube ends, and the corresponding burners 22, retain their spaced relationship, the tube end faces will be subjected to continued impingement of the heating flames and thereby fire polished. The adjacent tube ends now have identical finishes which may be regulated to the smallest bead possible. To complete the operation, the chucks 21 are released or opened and the carriage 10 is returned back along the track to the starting position while post 20 is also reset for severing the next portion of tubing.

Figure 4:
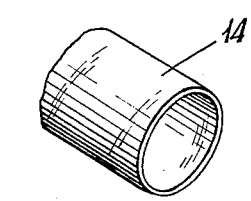
FIG. 4 illustrates the smooth tube end resulting from the severance of a glass tubing in accordance with the invention.
Figure 5:
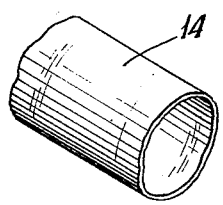
FIG. 5 is an illustration of the ragged tube edge resulting from the prior art flame method of tube cutting.

The tube end reproduced in FIG. 5 illustrates the irregular break which results when using the conventional flame crackoff method of severing glass tubing. In contrast, the tube end reproduced in FIG. 4 shows the transverse clean break and fine smooth edge finish resulting from the high speed flame cutoff method of the present invention.

Under laboratory test conditions, acceptable flame cutoff tube ends having a diameter of 1½ inches have been achieved in cycle times as low as 1.3 seconds.

An important advantage of the twin flame head burner assembly of the invention is that each of the tube ends resulting from a severing action may be simultaneously and identically fire polished to the finished state. Another advantage derived from the present invention is the virtual elimination of the individual sizing, crackoff and fire polishing operations. In addition, the present invention substantially reduces the incidence of glass loss now amounting to approximately 10% of all tubing severed by the conventional flame crackoff method. Also, because of the improved control over the tube end finish, the tube drawing speed can be substantially increased without sacrificing quality of tube end finish or incurring any significant increase in glass loss.

It will be understood that modifications and variations may be effected without departing from the novel concepts of the present invention.

What is claimed is:

1. A method of severing elongated glass tubing comprising applying a pair of convergent sheets of flame at the desired severing line, placing the tube under tension until severance is effected, and longitudinally separating said pair of convergent sheets of flame to impinge respectively upon the severed tube ends for simultaneously fire polishing the severed tube ends to a finished state.

2. Method for severing elongated glass tubing which comprises the steps of:
   moving the tubing into a heating zone, defined by a pair of axially positioned circular sheets of flame convergent at a localized band,
   advancing the heating zone concurrently with the tube to maintain the positioning of said localized band on the tube surface,
   applying axial tensions to the tube to effect a separation thereof at the said band,
   separating the pair of circular flames a sufficient distance to direct each of said flames on a severed tube end, and
   thereafter continuing the heating to flame polish each of the ends.

3. A method substantially as described in claim 2 wherein the glass tube is rotated axially during the process.

4. Method for severing elongated glass tubing which comprises the steps of moving the tubing into a heating zone defined by a pair of axially positioned circular sheets of flame convergent at a localized band,
   advancing said tubing and heating zone concurrently to position said band against the tubing wall partially rotating the heating zone about the axis of said tube, simultaneously applying axial tension to the tubing to effect a separation thereof at the heated band, and positioning the respective pair of circular flame sheets at a severed tube end to flame polish said end.

5. A method substantially as described in claim 4 in which the glass tube is rotated axially during the process.

References Cited by the Examiner

UNITED STATES PATENTS

| | | | |
|---|---|---|---|
| 1,723,107 | 8/29 | Wildeboer | 65—138 X |
| 1,888,635 | 11/32 | Koenig | 65—113 X |
| 2,221,788 | 11/40 | Doyle | 148—9.6 |
| 2,310,469 | 2/43 | Snyder | 255—93.5 |
| 2,373,979 | 2/46 | Everett | 260—97.6 |
| 2,402,452 | 6/46 | Schreiber | 65—283 |
| 2,494,387 | 1/50 | Harker | 65—271 |
| 2,570,899 | 10/51 | Wolf | 65—113 |
| 2,603,038 | 7/52 | McGowan | 65—176 |
| 2,612,001 | 9/52 | Denlinger | 225—2 |
| 2,629,205 | 2/53 | Eldred | 65—272 |
| 2,704,418 | 3/55 | Gerbaud | 65—269 X |
| 2,728,447 | 12/55 | Ware | 203—115 X |
| 2,764,847 | 10/56 | Buel | 65—113 |
| 2,776,048 | 1/57 | Friedman | 203—150 X |
| 2,521,352 | 9/57 | Dockerty et al. | 225—93.5 |
| 2,993,304 | 7/61 | Kiraly | 65—269 X |

FOREIGN PATENTS 685,752    4/30    France.

DONALL H. SYLVESTER, *Primary Examiner.*

CHARLES R. HODGES, IVAN R. LADY, ARTHUR P. KENT, MORRIS O. WOLK, *Examiners.*